United States Patent
Yano

(10) Patent No.: US 6,922,504 B2
(45) Date of Patent: Jul. 26, 2005

(54) OPTICAL POWER DEVICE PROTECTOR AND OPTICAL TRANSMISSION SYSTEM USING IT, AND METHOD FOR PROTECTING OPTICAL POWER DEVICE

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 152 days.

(21) Appl. No.: 10/119,945

(22) Filed: Apr. 11, 2002

(65) Prior Publication Data

US 2002/0159694 A1 Oct. 31, 2002

(30) Foreign Application Priority Data

Apr. 25, 2001 (JP) ........................................ 2001-126842

(51) Int. Cl.$^7$ ................................................ G02B 6/32
(52) U.S. Cl. ........................................ 385/33; 385/31
(58) Field of Search .................... 385/15, 31, 33–37, 385/88–94, 139, 140, 27

(56) References Cited

U.S. PATENT DOCUMENTS

| | | | | |
|---|---|---|---|---|
| 4,360,249 A | * | 11/1982 | Slemon | 385/51 |
| 4,639,076 A | * | 1/1987 | Mikolaicyk et al. | 385/74 |
| 4,815,807 A | * | 3/1989 | Kaneko et al. | 385/33 |
| 5,259,056 A | * | 11/1993 | Davenport et al. | 385/115 |
| 6,198,858 B1 | * | 3/2001 | Pan et al. | 385/24 |
| 6,477,295 B1 | * | 11/2002 | Lang et al. | 385/31 |
| 6,655,850 B2 | * | 12/2003 | Mann et al. | 385/74 |
| 2001/0038488 A1 | * | 11/2001 | Kinoshita | 359/341.41 |
| 2002/0063952 A1 | * | 5/2002 | Nyman et al. | 359/342 |

FOREIGN PATENT DOCUMENTS

JP 59038706 A * 3/1984 ............ G02B/7/26

OTHER PUBLICATIONS

Davis et al., "A Comparative Evaluation of Fiber Fuse Model", *SPIE*, vol. 2966, pp. 592–606.
Davis et al., "Experimental Data on the Fiber Fuse" *SPIE*, vol. 2714, pp. 202–210, Oct. 39–Nov. 1995.

* cited by examiner

Primary Examiner—Akm Enayet Ullah
Assistant Examiner—Sarah Song
(74) Attorney, Agent, or Firm—Foley & Lardner LLP

(57) ABSTRACT

A patch cord into which a collimator pair has been intercalated is attached to the output end of a high-level light amplifier for transmitting high-level light through optical fibers from outside in a replaceable manner. Even if burnout occurs at an end face of an optical fiber and the heat is conducted to the patch cord with collimators that is connected with an optical connector, meltdown by the fiber-fuse phenomenon can be prevented before it reaches the high-power optical amplifier without being propagated to the high-power optical amplifier because heat energy is dissipated at the collimator pair. By this, the high-power optical amplifier can be protected from the fiber-fuse phenomenon.

11 Claims, 6 Drawing Sheets

OPTICAL POWER DEVICE PROTECTOR AND OPTICAL TRANSMISSION SYSTEM USING IT, AND METHOD FOR PROTECTING OPTICAL POWER DEVICE

BACKGROUNDS OF THE INVENTION

1. Field of the Invention

The present invention relates to an optical power device protector and an optical transmission system using it. More particularly, the present invention relates to a protector for an optical power device designed to transmit light through optical fibers and an optical transmission system using such protector, and a method for protecting optical power devices.

2. Description of the Related Art

In today's fiber-optic transmission systems using optical fibers, WDM (Wavelength Division Multiplex) technology is used extensively in order to keep pace with the rapid increase in communication traffic. When this technology is used, the level of incoming light into optical fibers depends on the number of multiplexed wavelengths. In other words, the power level of light that is launched into optical fibers becomes considerably high as the number of multiplexed wavelengths increases. As a result, high-power optical amplifiers that are capable of outputting light whose level is in the previously-unimaginable watt range are being commercialized and gradually spreading.

In addition, the development of a technology for amplifying light, which is called distributed Raman amplification, is also being actively promoted with a view toward commercialization. Raman amplification is an amplification process that utilizes a mechanism, wherein launching signal light and pumping light, whose frequency is approx. 13 THz higher than signal light, simultaneously into an optical fiber made of silica glass causes part of the energy of pumping light to move into signal light due to the induced Raman scattering phenomenon that occurs in silica glass.

Distributed Raman amplification refers to a form of transmission wherein pumping light is launched into an optical fiber itself that is transmitting signals, by which signal light is amplified while it is transmitted. Propagation loss in a transmission line is thus compensated by this Raman amplification, and the accumulation of noise light caused by optical amplification relaying is suppressed, allowing the transmittable distance to be extended. In order to realize distributed Raman amplification, it is necessary to launch high-power pumping light of almost one watt into a transmission line optical fiber.

A similar method of inputting high-power light into a transmission line fiber is an optical amplification system based on remote pumping. A typical fiber-optic amplifier has a constitution wherein optical fibers doped with a rare earth element, e.g., erbium (Er) are excited in advance by inputting pumping light, and signal light is passed through these fibers to induce emission for amplification. Remote pumping refers to a constitution wherein a transmission line optical fiber is intercalated between an optical fiber doped with a rare earth element and a source of pumping light.

An advantage of this constitution is that transmission distance can be extended by the length of intercalated transmission line optical fibers used; a disadvantage is that the input power of pumping light must be made larger by the amount of loss caused by the intercalation of the transmission line optical fiber. The power of excitation has also reached the 1 W mark in recent years.

As stated above, in fiber-optic transmission systems using optical fiber, the level of power launched from an optical power device into optical fibers has been trending toward an increase, generating concerns that various problems may arise from use of such high-power light.

Many cases have been reported in which a level of light, which could be transmitted through an optical fiber cable without causing any problems in the cable itself, caused the optical connectors and other end faces of optical fibers to be burnt out. This problem cannot occur if an optical fiber cable is entirely fusion-spliced; since there is no optical connector in such a cable, the end faces of an optical fiber are not exposed and thus there is no possibility of their being burnt. Fusion-splicing an optical fiber cable entirely, however, is not a realistic practice, and cables are mostly connected with each other using optical connectors.

The problem of burnout of optical connectors and other elements has been known since when optical amplifiers was first commercialized. Many efforts have been made to eliminate this problem through various approaches, including replacing conventional materials for optical connector and other parts with wear-powder-free materials, improving the method of cleaning the end faces of optical fibers, and many others. These efforts, however, have not led to the complete elimination of burnout of optical fiber end faces. To the contrary, this problem is being experienced even more frequently as the power level of light has been heightened.

Another problem, which is still more serious, is a phenomenon called "fiber fuse," wherein burnout of an end face of an optical fiber triggers a chain reaction of burnout, causing the symptom to be propagated through the cable toward the optical power device. If the heat generated while an optical fiber end face was burning should cause the temperature of the optical fiber to exceed approx. 1,100 degrees C., a vicious circle occurs. That is, the absorption coefficient for the glass in the optical fiber increases rapidly to the extent that the heat is transferred through the optical fiber to reach the adjoining optical fiber. In turn, the absorption coefficient for the glass in the adjoining optical fiber increases, and so on.

The fiber fuse (meltdown) phenomenon, which is one of the problems that are concerned about in relation to inputting higher-level light into optical fibers, is reported in greater detail in SPIE Vol.2966, pp.592–606, "A comparative evaluation of fiber fuse model," and SPIE Vol.2714, pp.202–210, "Experimental data on the fiber fuse," both by D. D. Davis, S. C. Mettler, and D. J. DiGiovanni.

Once it occurs, the fiber-fuse phenomenon easily gets over the fuse-spliced parts of optical fibers, the connections of optical connectors, and other sections, ultimately causing damage to reach the inner part of the optical power device. Considering the difficulties expected in repair of an optical power device internally destroyed by the fiber-fuse phenomenon, it is critical to prevent the fiber-fuse phenomenon from progressing before it reaches the optical power device.

SUMMARY OF THE INVENTION

The present invention has been made to resolve these problems held by prior arts. An object of the present invention is to provide an optical power device protector for protecting effectively optical power devices connected with optical fibers from the fiber-fuse phenomenon, an optical transmission system using such protector, and a method for protecting optical power devices.

According to the first aspect of the invention, a protector for an optical power device designed to transmit light through optical fibers, comprises being provided at some midpoint of the optical fiber, and including an optical means which passes, among the light, only light in a pre-determined waveband and prevents light in wavebands other than the desired waveband from passing.

In the preferred construction, the optical power device is a light source for outputting light to the optical fiber.

In another preferred construction, the optical power device is a light amplifier for outputting light to the optical fiber.

In another preferred construction, the optical power device is a light source for outputting pumping light to the optical fiber.

In another preferred construction, the optical means comprises a dissipating means for converting the light in a desired waveband into parallel beams, and a converging means for condensing the parallel beams and transmitting the resultant light to the optical fiber.

In another preferred construction, the dissipating means and the converging means are arranged face-to-face.

In another preferred construction, the dissipating means and the converging means are arranged face-to-face through a pre-determined space.

In another preferred construction, the dissipating means and the converging means constitute a collimator pair.

In another preferred construction, the dissipating means and the converging means are combined integrally.

In another preferred construction, the optical power device protector comprises being attached to the output part of the optical power device in a replaceable manner.

According to the second aspect of the invention, an optical transmission system including an optical power device for outputting light, an optical repeater for relaying the light, a receiving device for receiving light from the optical repeater, and an optical fiber for connecting the optical power device, optical repeater, and receiving device with each other, comprises providing a protector which is provided at some midpoint of the optical fiber and which has an optical means for passing, among the light, only light in a pre-determined waveband and preventing light in wavebands other than the desired waveband from passing.

In the preferred construction, the protector is provided in the optical power device.

In another preferred construction, the optical repeater includes a light amplifier for amplifying light input from the optical fiber and transmitting the amplified light, and the light amplifier is provided with the protector.

According to another aspect of the invention, an optical transmission system including an optical power device for outputting light, an optical repeater for relaying the light, a receiving device for receiving light from the optical repeater, and an optical fiber for connecting the optical power device, optical repeater, and receiving device with each other, comprises the optical repeater including an exciting device which includes pumping light source for exciting the substances within the optical fiber and an optical wavelength multiplexer for multiplexing the light and pumping light that is emitted from the pumping light source, and the exciting device being provided with a protector which is provided at some midpoint of the optical fiber and which has an optical means for passing, among the light, only light in a pre-determined waveband and preventing light in wavebands other than the desired waveband from passing.

According to a further aspect of the invention, a method for protecting an optical power device designed to transmit light through optical fibers, comprising the steps of suppressing the progress of the fiber-fuse phenomenon by using an optical means for passing, among the light, only light in a pre-determined waveband and preventing light in wavebands other than the desired waveband from passing.

According to the present invention, the output end of an optical power device for transmitting light through optical fibers having optical connectors provided at their ends and an optical connector are connected with each other via a special cable into which a collimator pair has been intercalated, and are attached to the optical power device from outside in a replaceable manner. If the fiber-fuse phenomenon occurs, in which an end face of an optical fiber in an optical connector is burnt out, and the end face melts down due to the increased temperature, the heat energy conducted to the cable, which has a collimator pair intercalated and which is connected to the optical connector, is dissipated at the collimator pair. As a result, the conduction of heat is obstructed and the further progress of the fiber-fuse phenomenon is prevented. Because of this, the fiber-fuse phenomenon does not reach the inside of the light source of the optical power device and thus the failure of the transmission line optical fiber can be minimized. Furthermore, if the fiber-fuse phenomenon occurs, the optical transmission system can be repaired by merely replacing the cable with a collimator pair and the optical fiber that are burnt out, allowing for easy and inexpensive recovery.

Other objects, features and advantages of the present invention will become clear from the detailed description given here below.

BRIEF DESCRIPTION OF THE DRAWINGS

The present invention will be understood more fully from the detailed description given here below and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
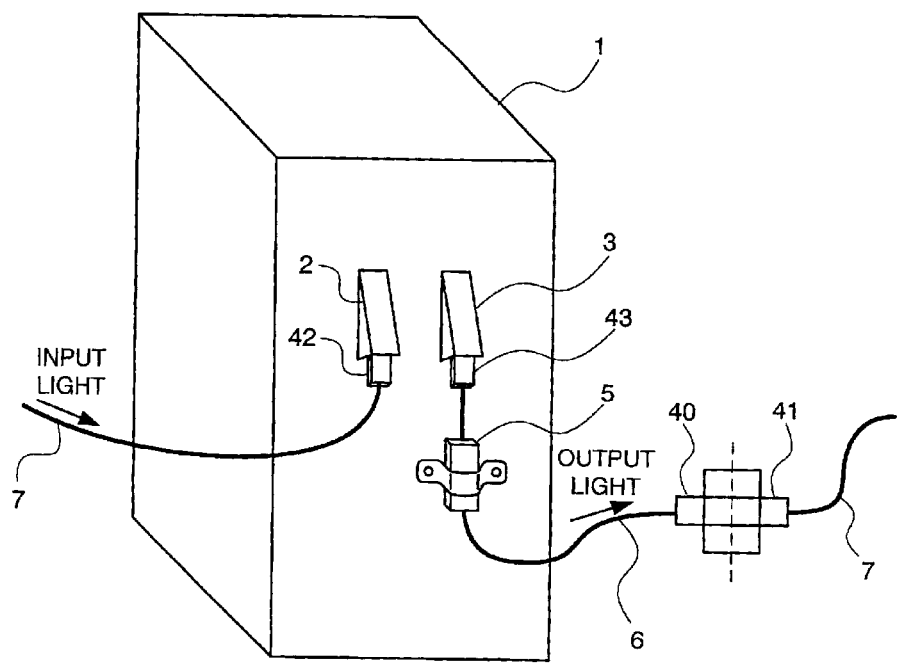
FIG. 1 is a constitutional drawing showing an embodiment wherein a protector according to the present invention is applied to a high-power optical amplifier.

FIG. 1 is a drawing showing a constitution wherein a protector for an optical power device according to an embodiment of the present invention is applied to a high-power optical amplifier. In FIG. 1, the high-power optical amplifier 1 according to the present embodiment has an input terminal 2 and an output terminal 3. It amplifies input light, which is input from an optical fiber 7 connected to an optical connector 42 of the input terminal 2, into high-level light, and outputs the amplified light as output light from the optical connector 43 of the out terminal 3.

The optical fiber cable 6, which is connected to the optical connector 43 of the out terminal 3, is a patch cord, a special type of cord with a collimator pair 5 intercalated between the other elements. The output of the patch cord with a collimator pair 6 is connected to the optical connector 40. The optical connector 40 and the optical connector 41, which is connected to an external optical cable 7, are connected with each other. The high-level output light, which has been output from the out terminal 3 of the high-power optical amplifier 1, is conducted to the optical fiber 7, via the optical connector 43, the collimator pair 5, the patch cord with a collimator pair 6, and the optical connectors 40 and 41.

The present embodiment is constituted by attaching the optical fiber cable with a collimator pair 6 (patch cord), in which a collimator pair is intercalated between the other elements, to the output part of the high-power optical amplifier 1, which is an optical power device, from outside in a replaceable (attachable/removable) manner.

Figure 2:
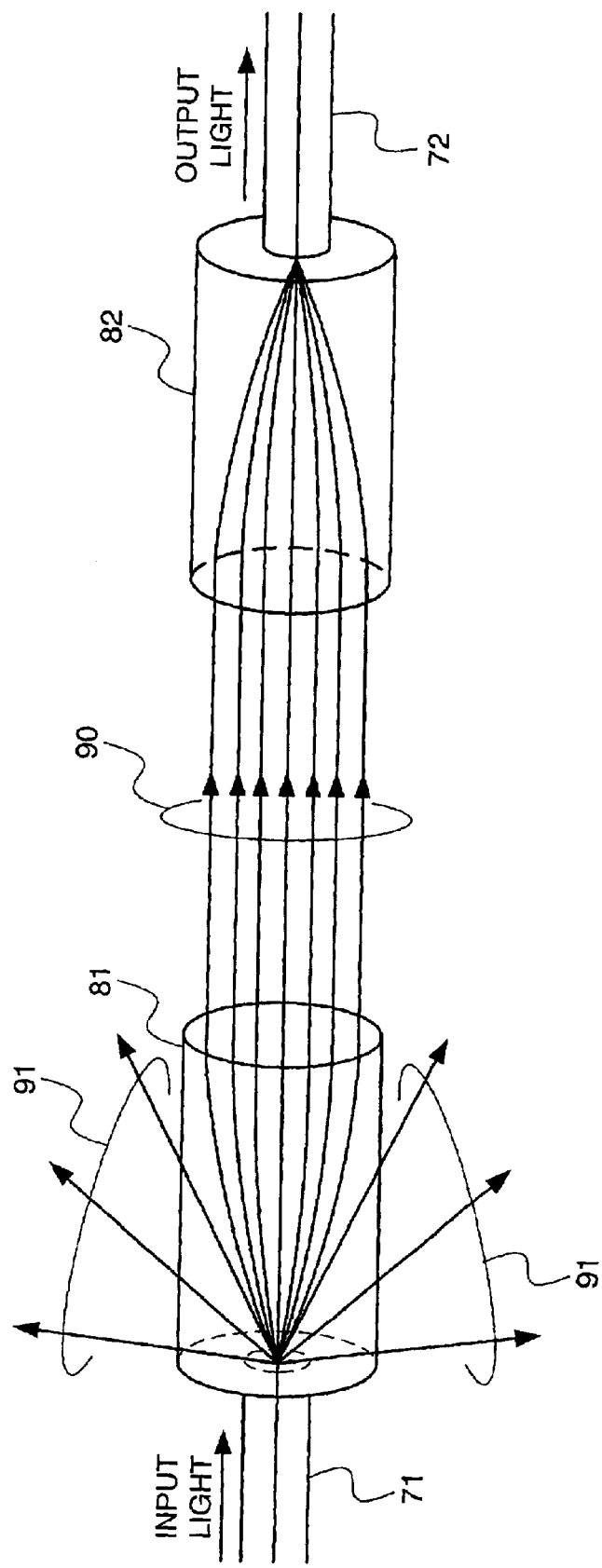
FIG. 2 is a constitutional drawing showing a collimator pair.

The collimator pair 5 shown in FIG. 1 will now be described in greater detail. FIG. 2 is a drawing showing the constitution of the collimator pair 5. In FIG. 2, 71 and 72 are optical fibers, and 81 and 82 are collimating lenses. Light in a desired waveband among the input light launched from the optical fiber 71, more specifically, light in the 1.55 μm waveband, is converted into light in a desired waveband 90 by the collimating lens 81 and the light in this 1.55 μm waveband 90 is condensed again by the collimating lens 82 and transmitted to the optical fiber 72.

Light outside a desired waveband among the input light launched from the optical fiber 71, i.e., light in wavebands other than 1.55 μm, is converted into divergent light 91 by the collimating lens 81 and dissipated without being transmitted to the optical fiber 72. In other words, among the energy of input light that has been input into the optical fiber 71, only the energy of light in a desired frequency band is transmitted to the optical fiber 72.

An integrated combination of an optical fiber 71 and a collimating lens 81, or that of an optical fiber 72 and a collimating lens 82, is called a collimator, or otherwise a beam expander. An arrangement of these two collimators facing each other is called a collimator pair. Collimators are commercially available, commonly using the graded index type (hereinafter abbreviated as "GRIN") rod lens as their collimating lenses. Collimating lenses 81 and 82 are usually placed at a distance of 10 mm to 15 mm from each other, and achieve a lower propagation loss of 0.2 dB or less while light in a desired frequency band passes through them.

This collimator pair 5 is widely used for industrial applications because various modules of optical parts can be created by intercalating an appropriate optical part between the collimating lenses 81 and 82. Examples include an optical filter module, which is created by intercalating a dielectric multi-layer filter plate, and an optical isolator, which is created by intercalating a Faraday device.

Figure 3:
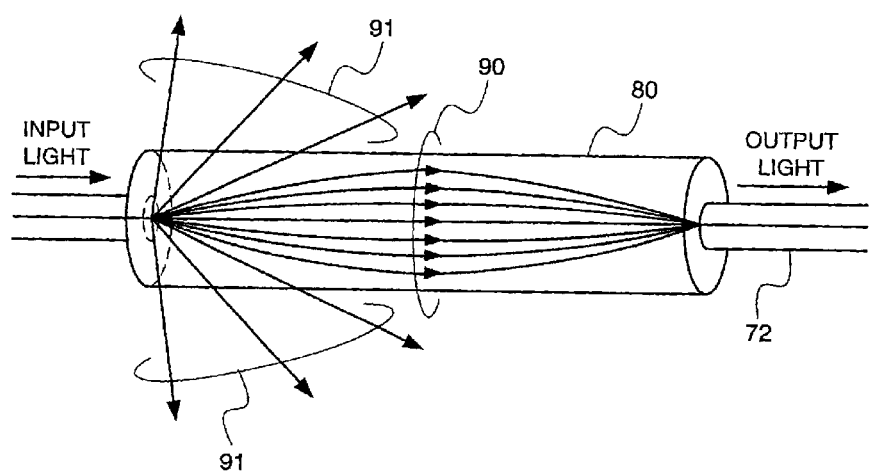
FIG. 3 is another constitutional drawing showing a collimator pair.

The present invention is constituted as a module of optical parts with no optical part intercalated between collimating lenses 81 and 82. Therefore, as shown in FIG. 3, it is possible to constitute a collimator using only one GRIN rod lens. Our collimator uses a GRIN rod lens with a pitch of approx. 0.50, twice higher than approx. 0.25 pitch for GRIN rod lenses that are commonly used for collimators. Pitch refers to a wobble cycle of light in a GRIN lens. With a pitch of approx. 0.25, a point source placed at the entry end face emerges as parallel beams. With a pitch of approx. 0.50, the inverted image of an image placed at the entry end face is focused on the exit end face. FIG. 3 is a drawing showing the constitution of another collimator pair 5. In FIG. 3, elements that are equivalent to those in FIG. 2 are marked with the same code numbers. The GRIN rod lens 80 with a pitch of approx. 0.50 is an integrated combination of the collimating lenses 81 and 82 in FIG. 2, and light in a desired waveband 90 is propagated through the collimating lens 80 without going through any other space.

The operation of an optical power device protector according to the present invention will now be described in greater detail with reference to FIG. 1. In FIG. 1, a portion susceptible to the fiber-fuse phenomenon is the optical connector section at which the end faces of optical fibers are exposed. An optical connector that is nearer to the optical power device propagates higher-level light, and thus the risk of the fiber-fuse phenomenon is higher.

If the fiber-fuse phenomenon occurs in any of the optical fibers, for example, if the end face of the optical connector 41 on the optical fiber 7 in FIG. 1 burns out, the heat from the burning propagates to the adjoining optical connector 40, causing the temperature of the patch cord with a collimator pair 6 to rise. The heat then goes along the patch cord with a collimator pair 6 toward the high-power optical amplifier 1.

As described with reference to FIG. 2, the heat transmitted to the collimating lens on the optical connector 40 side of the collimator pair 5 in the patch cord with a collimator pair 6 is not light in the desired waveband which is to pass through the collimator, so it is dissipated as divergent light by the collimating lens. In other words, the heat energy that has reached the collimating lens on the optical connector 40 side of the collimator pair 5 is dissipated by the collimating lens located on the optical connector 40 side without being transmitted to the collimating lens located on the optical connector 43 side.

By this, the amount of heat that is transmitted to the collimating lens located on the optical connector 43 becomes minimum, and the heat caused by the burnout is blocked when it reaches the collimating lens located on the optical connector 40, thereby preventing the fiber-fuse phenomenon from progressing further. Therefore, the fiber-fuse phenomenon does not propagate to the high-power optical amplifier 1 and the internal destruction of the high-power optical amplifier 1 is prevented.

Figure 4:
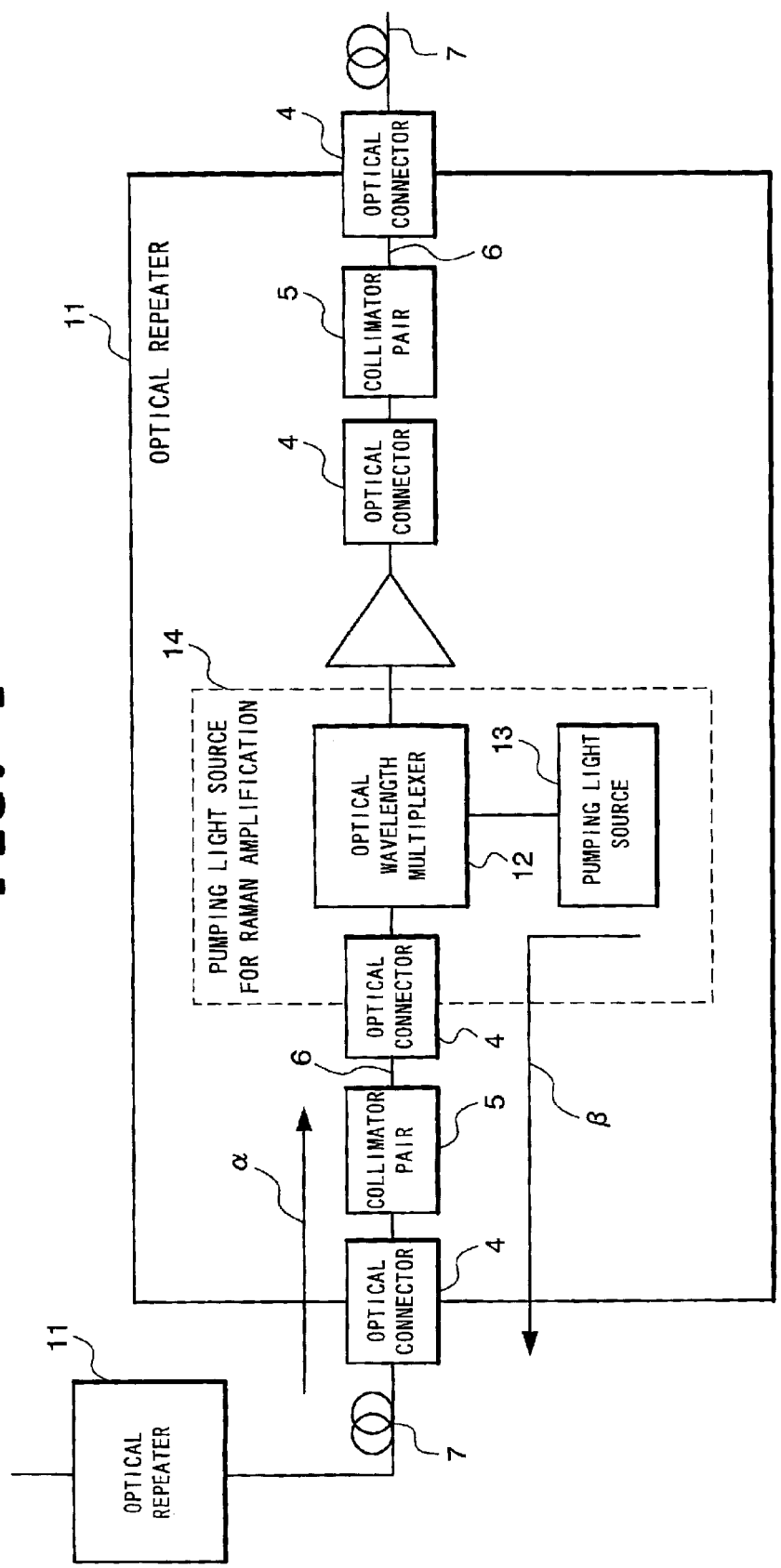
FIG. 4 is a block diagram showing a constitution wherein a protector according to the present invention is applied to a distributed amplification system.

Another embodiment of the present invention will now be described. FIG. 4 is a block diagram showing a constitution wherein a protector according to the present invention is applied to a distributed amplification system. In this constitution, distributed amplification refers to compensating a loss in a distributed manner while transmitting light through a transmission line, as is done in distributed Raman amplification. In FIG. 4, the code number 4 denotes an optical connector, and the code number 11 denotes an optical repeater including an pumping light source for Raman amplification 14, wherein the pumping light source for Raman amplification 14 comprises an optical wavelength multiplexer 12 and an pumping light source 13. Elements that are equivalent to those in FIG. 1 are marked with the same code numbers.

In FIG. 4, distributed Raman amplification launches pumping light β from the pumping light source 13 via the optical wavelength multiplexer 12 into the optical fiber 7 to meet signal light α that is output from the optical repeater 11, and moves the optical energy from pumping light β to signal light α by utilizing the induced Raman scattering phenomenon that takes place within the optical fiber to amplify signal light α. Therefore high-level pumping light β is passing through the optical connector 4 on the input side of the optical repeater 11.

In such a case, a patch cord with a collimator pair 6, into which a collimator pair 5 is intercalated, is used as a cable for connection between the optical connector 4 at the input end of the optical repeater 11 and the optical connector 4 at the input end of the pumping light source for Raman amplification 14.

Since high-level pumping light is passing through the optical fiber 7 on the input side of the optical repeater 11, the destruction of the pumping light source for Raman amplification 14 is prevented. This is because, as described with reference to FIG. 1, even if burnout occurs at an end face of the optical fiber 7 at the optical connector 4 at the input end of the optical repeater 11, the heat that reaches the patch cord with a collimator pair 6 is dissipated by a collimating lens located on the input side of the optical repeater 11, and thus the fiber-fuse phenomenon is not propagated to the pumping light source for Raman amplification 14 in the optical repeater 11.

Figure 5:
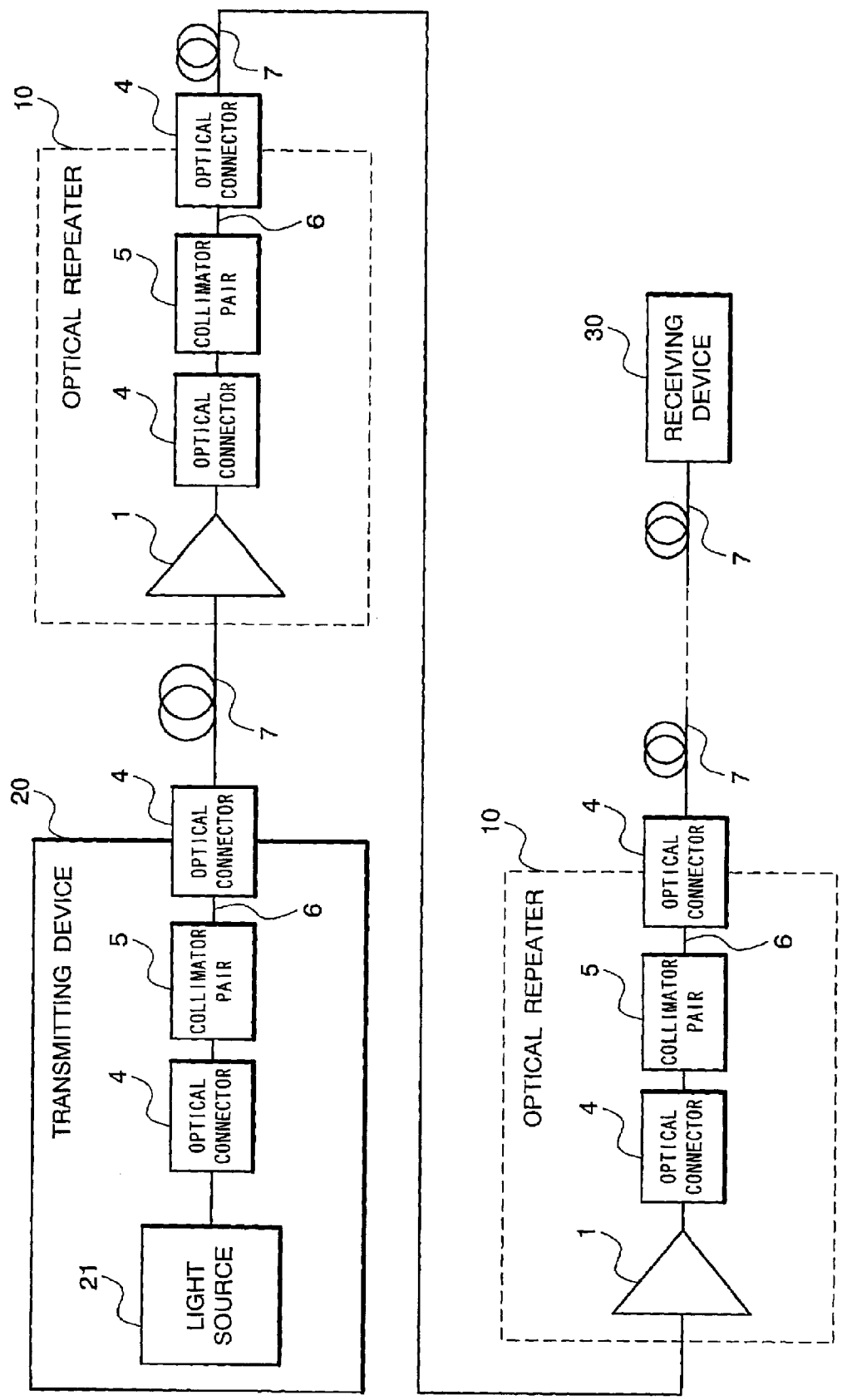
FIG. 5 is a block diagram showing a constitution wherein a protector according to the present invention is applied to a concentrated amplification system.

Yet another embodiment of the present invention will now be described. FIG. 5 is a block diagram showing a constitution wherein a protector according to the present invention is applied to a concentrated amplification system, concentrated amplification herein refers to compensating loss generated in a transmission line centrally by a repeater, as is done by an EDFA (Er Doped Fiber Amplifier). In FIG. 5, the amplification system comprises a transmitting device 20 for outputting light to an optical fiber 7, an optical repeater 10 for relaying light that has been output to the optical fiber 7, and a receiving device 30 for receiving the relayed light. This optical transmission system is assumed to have at least one optical repeater 10.

In FIG. 5, the transmitting device 20 has a light source 21 for generating light. An optical connector 4 on the output side of the light source 21 and an optical connector 4 that provides connection between the transmitting device 20 and the optical fiber 7 are connected by a patch cord with a collimator pair 6, into which a collimator pair 5 is intercalated. Furthermore, each optical repeater 10 has a high-power optical amplifier 1. An optical connector 4 on the output side of the optical repeater 10 and an optical connector 4 that provides connection between the optical repeater 10 and the optical fiber 7 are also connected by a patch cord with a collimator pair 6, into which a collimator pair 5 is intercalated.

The operation of the amplification system in FIG. 5 will now be described. In FIG. 5, light sent out from the light source 21 passes through the optical connector 4, the collimator pair 5, and the patch cord with a collimator pair 6, is output into the optical fiber 7 that is connected with an external element via the optical connector 4, is amplified to a pre-determined level by the optical repeater 10 that is inserted at some midpoint, and is ultimately received by the receiving device 30.

In this constitution, as described with reference to FIG. 1, if burnout should occur either at the optical connector 4 provided at output of the transmitting device 20 or at the end face of an optical fiber 7 connected with the optical connector 4 provided at output of each optical repeater 10, heat energy is dissipated at the collimating lens in the collimator pair 5, and thus the fiber-fuse phenomenon is not propagated to the light source 21 in the transmitting device 20 or the high-power optical amplifier 1 in the optical repeater 10, thereby preventing the destruction of the light source 21 and the high-power optical amplifier 1.

Figure 6:
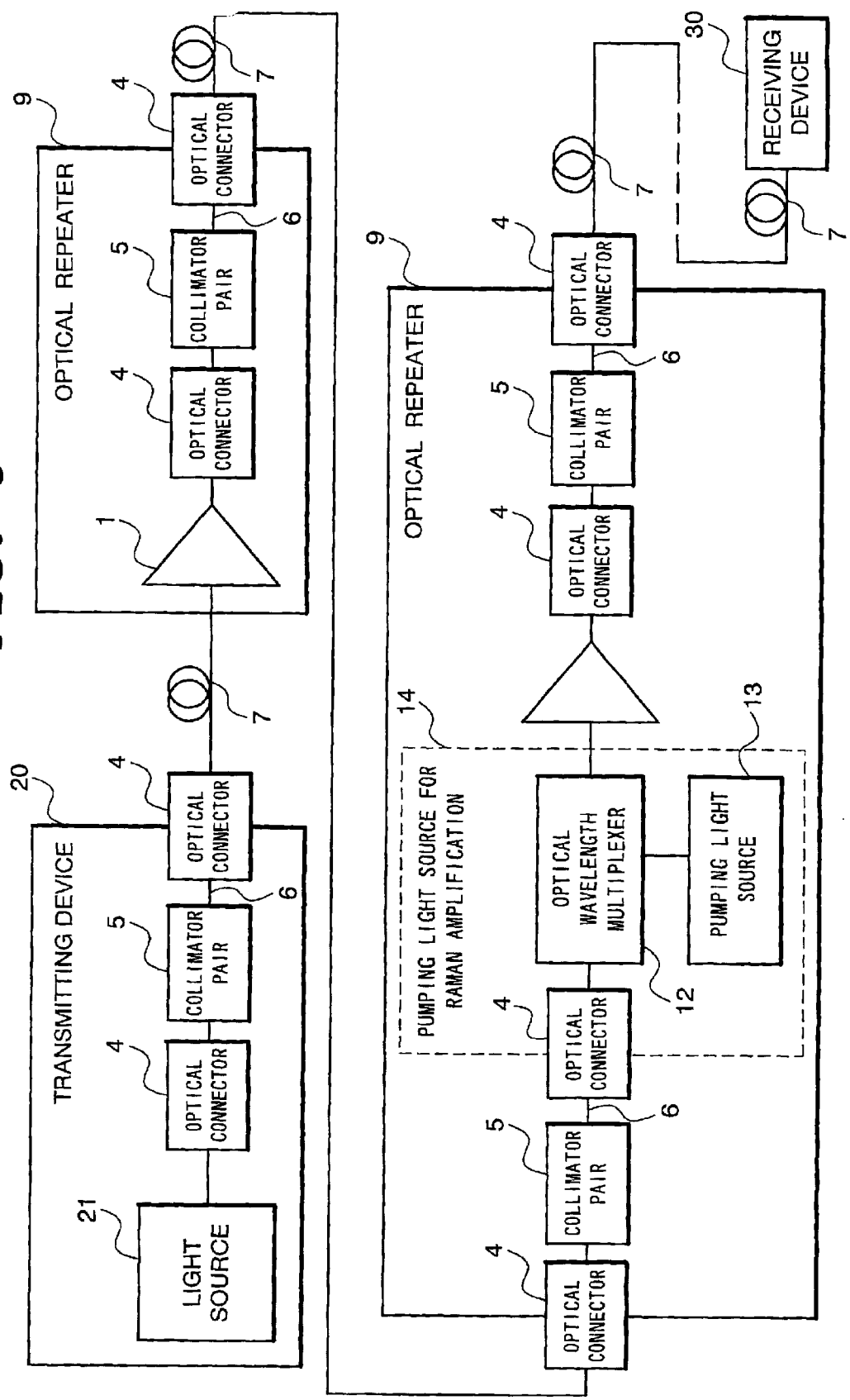
FIG. 6 is a block diagram showing a constitution wherein a protector according to the present invention is applied to a hybrid system.

FIG. 6 is a block diagram showing a constitution wherein a protector according to the present invention is applied to a hybrid system. The amplification system shown in FIG. 6 is an amplification system wherein some optical amplifiers in the optical repeater shown in FIG. 5 are based on distributed amplification and others are based on concentrated amplification. In FIG. 6, elements that are equivalent to those in FIGS. 4 and 5 are marked with the same code numbers. In this amplification system as well, it is assumed that at least one optical repeater 9 is provided.

In FIG. 6, each optical repeater 9 has an pumping light source for Raman amplification 14. The optical connector 4 on the input side of the optical repeater 9, which is a connection point with the optical fiber 7, and the optical connector 4 on the input side of the pumping light source for Raman amplification 14 are connected by a patch cord with a collimator pair 6, into which a collimator pair 5 is intercalated. Since the operation of the pumping light source for Raman amplification 14 and that of the optical transmission system in FIG. 6 are similar to those described with reference to FIGS. 4 and 5, detailed descriptions of them will be omitted.

In this constitution, as described with reference to FIG. 1, if burnout should occur either at the optical connector 4 provided at output of the transmitting device 20 or at the end face of an optical fiber 7 connected with the optical connector 4 provided at output of each optical repeater 9, heat energy is dissipated at the collimating lens in the collimator pair 5, and thus the fiber-fuse phenomenon is not propagated to the light source 21 in the transmitting device 20 or the pumping light source for Raman amplification 14 in the optical repeater 9, thereby preventing the destruction of the light source 21 and the pumping light source for Raman amplification 14.

As described in the foregoing, even if the fiber-fuse phenomenon occurs at an end face of an optical fiber connected with an optical connector, the optical transmission system can be repaired merely by replacing the patch cord with a collimator pair 6, into which a collimator pair 5 is intercalated, and the optical connector 4 and optical fiber 7 that have burnt out, without needing to work on the light source 21, the high-power optical amplifier 1, or the pumping light source for Raman amplification 14. The patch cord with a collimator pair 6, into which a collimator pair 5 is intercalated, is inexpensive and requires less space, and thus it can be kept in stock as a maintenance part of the optical transmission system.

It will be appreciated that the present invention is not limited to the embodiments described above and can be modified as necessary without departing from the technical spirit and scope of the present invention. For example, while the embodiments above have been described in relation to cases where the protector is applied to a high-power optical amplifier, Raman amplifier and the like, it will be apparent that the protector can be applied to a wide range of optical power devices that output light.

As explained above, according to the present invention, by attaching a patch cord with a collimator pair intercalated to an optical power device from outside in a replaceable manner, meltdown by burnout can be prevented before it reaches the optical power device even if the fiber-fuse phenomenon occurs due to the burnout of an end face of an optical fiber. Therefore, the present invention has an effect of preventing the internal destruction of an optical power device from occurring.

Furthermore, according to the present invention, a patch cord with a collimator pair is inexpensive and features low-loss performance, and thus a decrease in light level in practical use is minimum. Another effect of the present invention is that, if the fiber-fuse phenomenon should occur, the optical transmission system can be recovered easily at lower costs by merely replacing the patch cord with a collimator pair or optical fiber that has burnt out.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An optical power device protector that protects an optical power device, the optical power device including a first connector configured to connect to a first optical fiber member to receive input light therefrom, the optical power device further including an amplification unit configured to amplify the input light to thereby obtain high-level light, and the optical power device still further including a second connector configured to connect to a second optical fiber member to thereby provide the high-level light to an external location, the optical power device protector comprising:
    at least two optical fiber members, wherein one of the at least two optical fiber members corresponds to the second optical fiber member;
    a collimator pair disposed between said at least two optical fiber members;
    wherein said collimator pair passes light only in a pre-determined waveband and prevents conduction of heat generated by transmission of light, and
    said optical fiber members with said collimator pair are attached to the outside of said optical power device in a replaceable manner, and
    said optical power device protector is configured to protect said optical power device from being overheated due to heat generated on said optical fiber members by way of a fiber-fuse phenomenon, by blocking the heat from passing in a direction towards said optical power device.

2. The optical power device protector as set forth in claim 1, wherein said optical power device is a light source for outputting light to said optical fiber.

3. The optical power device protector as set forth in claim 1, wherein said optical power device is a high-power optical amplifier for outputting light to said optical fiber.

4. The optical power device protector as set forth in claim 1, wherein said optical power device is a light source for outputting pumping light to said optical fiber.

5. The optical power device Protector as set forth in claim 1, wherein said optical power device further comprises:
    a housing having an inner surface and an outer surface;
    and wherein said optical power device protector further comprises:
    means for replaceably connecting said optical fiber members with said collimator pair to the outer surface of said housing.

6. An optical power device protector that protects an optical power device, the optical power device including a first connector configured to connect to a first optical fiber member to receive input light therefrom, the optical power device further including an amplification unit configured to amplify the input light to thereby obtain high-level light, and the optical power device still further including a second connector configured to connect to a second optical fiber member to thereby provide the high-level light to an external location, the optical power device protector comprising:
    at least two optical fiber members, wherein one of the at least two optical fiber members corresponds to the second optical fiber member;
    a collimator pair disposed between said optical fiber members, said collimator pair being comprised of:
    a dissipating means for converting light in a pre-determined waveband into parallel beams, and
    a converging means for condensing said parallel beams and transmitting the resultant light to said optical fiber, whereby said collimator pair passes light only in said pre-determined waveband;
    wherein said dissipating means and said converging means are arranged face-to-face with no optical part intercalated therebetween;
    wherein said dissipating means and said converging means are combined integrally, and
    wherein said optical fibers members with said collimator pair is attached to the outside of said optical power device protector in a replaceable manner, and
    wherein said optical power device protector is configured to protect said optical power device from being overheated due to heat generated on said optical fiber members by way of a fiber-fuse phenomenon, by blocking the heat from passing in a direction towards said optical power device.

7. The optical power device protector as set forth in claim 6, wherein said dissipating means and said converging means are arranged face-to-face through a pre-determined space.

8. The optical power device protector as set forth in claim 6, wherein said optical power device further comprises:
    a housing having an inner surface and an outer surface;
    and wherein said optical power device protector further comprises:
    means for replaceably connecting said optical fiber members with said collimator pair to the outer surface of said housing.

9. An optical power device protector that protects an optical power device, the optical power device including a first connector configured to connect to a first optical fiber member to receive input light therefrom, the optical power device further including an amplification unit configured to amplify the input light to thereby obtain high-level light, and the optical power device still further including a second connector configured to connect to a second optical fiber member to thereby provide the high-level light to an external location, the optical power device protector comprising:
    at least two optical fiber members, wherein one of the at least two optical fiber members corresponds to the second optical fiber member;

a collimator pair disposed between said optical fiber members, said collimator pair being comprised of:

a dissipating means for converting light in a pre-determined waveband into parallel beams, and a converging means for condensing said parallel beams and transmitting the resultant light to said optical fiber, whereby said collimator pair passes light only in said pre-determined waveband;

wherein said dissipating means and said converging means are arranged face-to-face with no optical part intercalated therebetween, and wherein said collimator pair forms part of a patch cord that attaches to an output part of an optical power device, and wherein said optical fibers members with said collimator pair is attached to the outside of said optical power device protector in a replaceable manner, and wherein said optical power device protector is configured to protect said optical power device from being overheated due to heat generated on said optical fiber members by way of a fiber-fuse phenomenon, by blocking the heat from passing in a direction towards said optical power device.

10. The optical power device protector as set forth in claim 9, wherein said optical power device further comprises:

a housing having an inner surface and an outer surface;

and wherein said optical power device protector further comprises:

means for replaceably connecting said optical fiber members with said collimator pair to the outer surface of said housing.

11. An optical power device protector, comprising:

a high-power optical amplifier which amplifies input light and which outputs high-level light;

a first optical fiber which transmits said high-level light;

a collimator pair which converts said high-level light into collimated light and which condenses said collimated light as said high-level light again, said collimator pair being attached to an outside of said high-power optical amplifier in a replaceable manner; and a second optical fiber which transmits said high-level light condensed again, wherein when a fiber-fuse phenomenon occurs at an end face of said second optical fiber, said optical power device protector prevents fusing by said fiber-fuse phenomenon to said high power optical amplifier by distributing thermal energy of said high-level light by said collimator pair.

* * * * *